(12) United States Patent
Kinashi

(10) Patent No.: US 11,916,453 B2
(45) Date of Patent: Feb. 27, 2024

(54) STATOR AND ROTARY ELECTRIC MACHINE

(71) Applicant: ICHINOMIYA DENKI CO., LTD., Shisou (JP)

(72) Inventor: Yoshikazu Kinashi, Shisou (JP)

(73) Assignee: ICHINOMIYA DENKI CO., LTD., Shisou (JP)

(*) Notice: Subject to any disclaimer, the term of this patent is extended or adjusted under 35 U.S.C. 154(b) by 0 days.

(21) Appl. No.: 17/738,237

(22) Filed: May 6, 2022

(65) Prior Publication Data
US 2022/0376578 A1  Nov. 24, 2022

(30) Foreign Application Priority Data

May 21, 2021 (JP) ................................ 2021086145A

(51) Int. Cl.
*H02K 3/32* (2006.01)
*H02K 1/2706* (2022.01)

(52) U.S. Cl.
CPC ............. *H02K 3/32* (2013.01); *H02K 1/2706* (2013.01)

(58) Field of Classification Search
CPC ......... H02K 1/2706; H02K 3/32; H02K 3/345
See application file for complete search history.

(56) References Cited

U.S. PATENT DOCUMENTS

| | | | | | |
|---|---|---|---|---|---|
| 2,856,547 | A | * | 10/1958 | Saums | H02K 3/32 310/179 |
| 3,334,255 | A | * | 8/1967 | Peters | H02K 3/345 310/214 |
| 5,763,978 | A | * | 6/1998 | Uchida | H02K 3/345 310/214 |
| 5,864,193 | A | * | 1/1999 | Katoh | H02K 3/34 310/43 |
| 8,610,328 | B2 | * | 12/2013 | Yoshida | H02K 3/522 310/194 |
| 2005/0225190 | A1 | * | 10/2005 | Kinashi | H02K 1/2733 310/156.43 |
| 2012/0080976 | A1 | * | 4/2012 | Oka | H02K 3/522 310/215 |
| 2012/0126653 | A1 | * | 5/2012 | Yang | H02K 1/146 310/156.32 |

(Continued)

FOREIGN PATENT DOCUMENTS

| | | | |
|---|---|---|---|
| JP | 04-210746 | A | 7/1992 |
| JP | 04210746 | A * | 7/1992 |

(Continued)

OTHER PUBLICATIONS

JP-04210746-A, Ida et al. all pages (Year: 1992).*

*Primary Examiner* — Naishadh N Desai
(74) *Attorney, Agent, or Firm* — Jordan and Koda, PLLC

(57) ABSTRACT

In a stator or a rotary electric machine, an insulating sheet spreads between two coils adjacent to each other in a circumferential direction in each slot. The insulating sheet covers the end in a third direction of the coil wound in a corresponding tooth, between end surfaces in an axial direction and between an inward-directed surface and an inclined surface in a radial direction. In the slot, an insulating sheet wrapping the adjacent coil is present, but the insulating sheet does not cover the end in a fourth direction of the coil wound around the corresponding tooth.

16 Claims, 7 Drawing Sheets

(56) References Cited

U.S. PATENT DOCUMENTS

2013/0147307 A1\* 6/2013 Morooka ............... C09J 151/08
174/209
2015/0188372 A1\* 7/2015 Yokota .................... H02K 3/38
310/43

FOREIGN PATENT DOCUMENTS

| JP | 2004-350434 A | 12/2004 |
| JP | 5866026 B | 2/2016 |
| JP | 2019-062680 A | 4/2019 |

\* cited by examiner

STATOR AND ROTARY ELECTRIC MACHINE

BACKGROUND OF THE INVENTION

The present invention relates to a stator and a rotary electric machine using the same.

In an inner rotor type brushless motor (hereinafter, also simply referred to as a motor), for example, a plurality of split cores is arranged in a cylindrical shape around the rotation axis of a rotor to form a stator. Each split core has a substantially T-shape when viewed from the axial direction. In each split core, a tooth extends from a core back toward the rotor. To each tooth, an insulator formed of resin, for example, is attached. A coil is wound around each tooth via the insulator (see, Japanese Patent No. 5866026, for example).

To reduce the size of the motor, it is necessary to lay out a plurality of coils with high density in the circumferential direction of the rotation axis to improve the occupancy (hereinafter, also referred to as "space factor" in this specification) of coil conductors in a slot. Herein, the slot is a space which is partitioned mainly by the core back and the tooth and in which the coil conductor is wound.

In the background art, as illustrated in FIG. 7, in each coil 701, a part passing between a core back 702 and a tooth tip 704 of a tooth 703 is wrapped by an insulating sheet 705, and both ends 705A and 705B of each insulating sheet 705 are laminated in two layers and are bonded.

Therefore, in the background art, between the two coils 701 adjacent to each other in a circumferential direction 707 in the same slot 706, a portion is generated where both the ends 705A and 705B of the two insulating sheets 705 are interposed and four layers of the insulating sheets 705 in total are present. As a result, the space factor decreases, which has posed a problem that it is difficult to reduce the size of the motor.

SUMMARY OF INVENTION

The present invention has been made in view of the above-described circumstances. It is an object of the present invention to provide a technique of reducing the size of a rotary electric machine, such as a motor.

(1) The present invention is directed to a stator including: a plurality of split cores each having a yoke and a tooth, the split cores being connected such that the yokes form an annular shape; and coils each wound around each tooth with two insulating sheets interposed between the coil and the tooth. The two insulating sheets include at least one of a first insulating sheet and a second insulating sheet. The first insulating sheet is located between a side surface of the tooth and the coil wound around the tooth, and wraps the coil. The second insulating sheet is located between a side surface of the tooth and the coil wound around the tooth, and does not cover a part of the coil, the part being on a side of an adjacent coil. The first insulating sheet and the second insulating sheet are adjacently located in the coils adjacent to each other.

According to the above-described configuration, since the first insulating sheet is present between the adjacent coils, electrical insulation properties between these coils are secured. Further, since the first insulating sheet and the second insulating sheet do not overlap with each other between the adjacent coils, the space factor does not decrease.

(2) The first insulating sheet wraps the coil in a single layer.

According to the above-described configuration, since the first insulating sheet is a single layer, the space factor does not decrease.

(3) The first insulating sheet is opened on a tip side of the tooth.

According to the above-described configuration, the adjacent coils are difficult to contact each other.

(4) One of the first insulating sheet and the second insulating sheet is located on both side surfaces of the tooth.

(5) In the tooth, one of the first insulating sheet and the second insulating sheet is located on one side surface, and another one of the first insulating sheet and the second insulating sheet is located on another side surface.

(6) The stator further includes a first insulator covering a first end surface directed in an axial direction of the stator in the tooth; and a second insulator covering a second end surface directed in the axial direction of the stator in the tooth. The coil is wound around the tooth via the first insulator and the second insulator.

According to the above-described configuration, the insulation properties between the coil and the tooth can be secured, and the coil is wound easily.

(7) The first insulator covers a part of both of the side surfaces of the tooth, and the second insulator covers a part of both of the side surfaces of the tooth. In one of the two insulating sheets, both of end portions in the axial direction are located between the first insulator and the second insulator, and the side surface of the tooth. In another one of the two insulating sheets, both of the end portions in the axial direction are located between the first insulator and the second insulator, and the side surface of the tooth.

According to the above-described configuration, one end portion of each insulating sheet is supported between the first insulator and the tooth, and the other end portion of each insulating sheet is supported between the second insulator and the tooth. Thus, the insulation properties between the coil and the tooth can be more favorably secured, and the coil is wound more easily.

(8) The present invention is directed to a rotary electric machine including: the stator; and a rotor inserted through the stator and having a magnet.

According to the present invention, the size of a motor can be reduced.

BRIEF DESCRIPTION OF DRAWINGS

FIG. 3A is a schematic diagram when the split core 34 is viewed from an axial direction 102, FIG. 3B is a schematic diagram when the split core 34 is viewed from a fourth direction A32, and FIG. 3C is a schematic diagram when the split core 34 is viewed from a third direction A31.

DETAILED DESCRIPTION OF PREFERRED EMBODIMENTS OF THE INVENTION

Hereinafter, a stator 33 and a rotary electric machine 10 according to an embodiment of the present invention are described. It is a matter of course that the embodiment described below is only an example of the present invention, and the embodiment can be altered as appropriate without altering the gist of the present invention.

[Schematic Configuration of Rotary Electric Machine 10]

Figure 1:
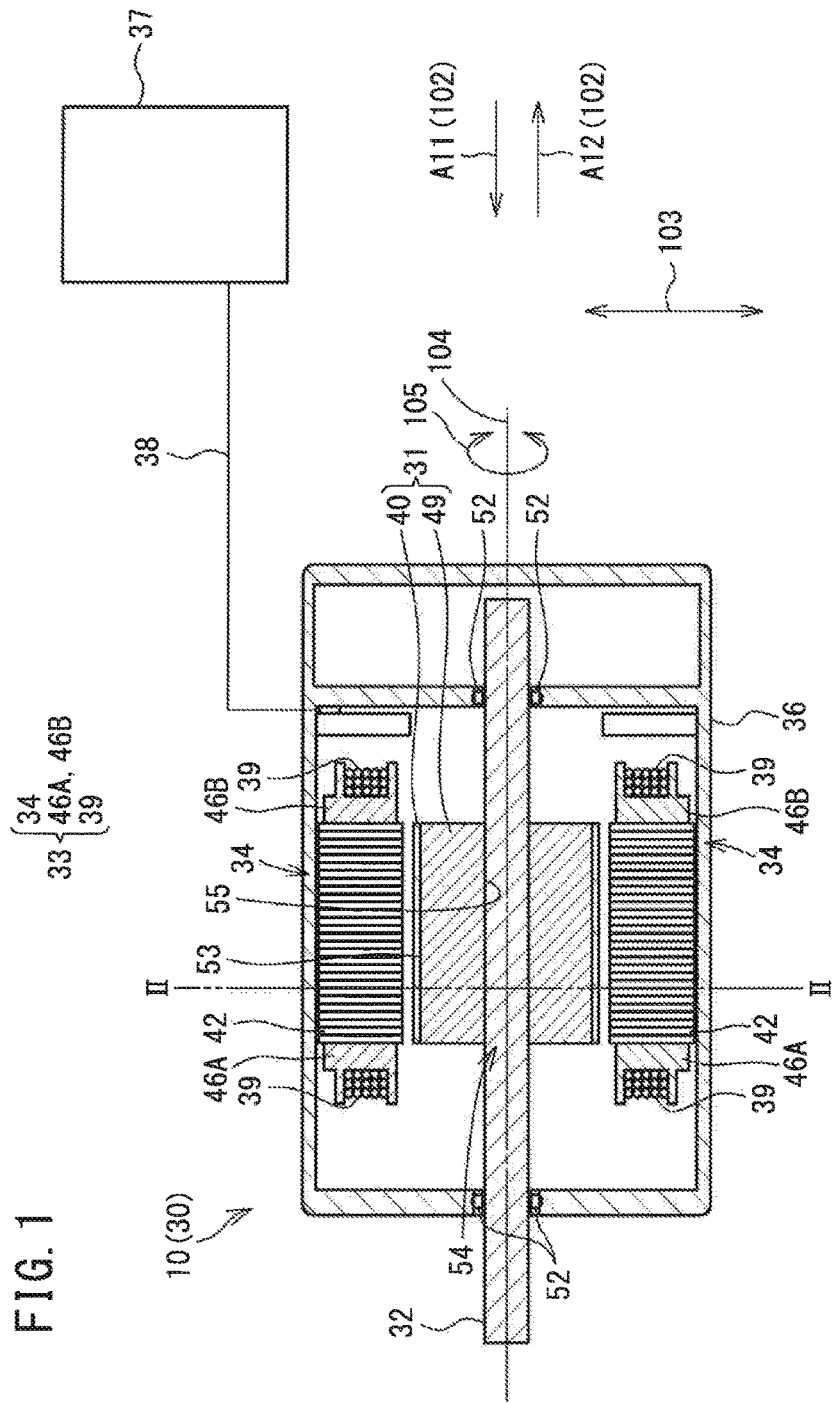
FIG. 1 is a cross-sectional view illustrating the internal configuration of a rotary electric machine 10.

In FIG. 1, the rotary electric machine 10 is an electric motor, and more specifically an inner rotor type brushless motor (hereinafter, also simply referred to as "motor") 30. The motor 30 includes a rotor 31, a shaft 32, the stator 33, and the like inside a housing 36 in actual use after shipment from a factory. The motor 30 is electrically connected to a controller 37 via a harness 38.

[Rotor 31]

Figure 2:
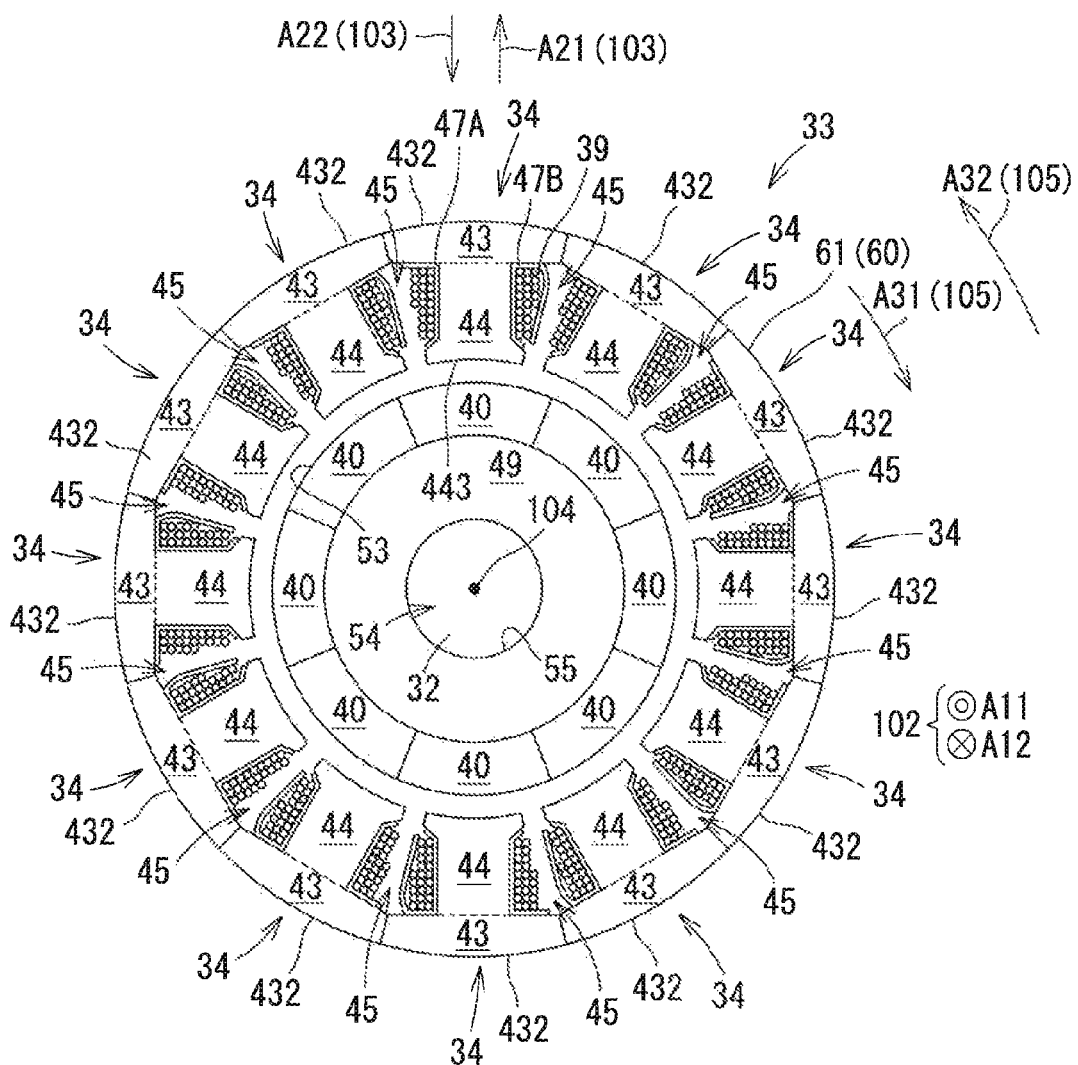
FIG. 2 is a cross-sectional view of the rotary electric machine 10 along the II-II line of FIG. 1.

In FIGS. 1 and 2, the rotor 31 is rotatable in a circumferential direction 105 of an axis 104 extending in an axial direction 102. The axis 104 is illustrated by an alternate long and short dash line in FIG. 1 and is illustrated by a black dot (•) in FIG. 2. The rotor 31 includes a rotor core 49. The rotor core 49 is a laminated body in which thin electromagnetic steel sheets having a substantially annular shape are laminated in the axial direction 102. The rotor core 49 has a substantially cylindrical shape and has an outer peripheral surface 53 and an inner peripheral surface 55 having different diameters from each other. The outer peripheral surface 53 and the inner peripheral surface 55 share the axis 104 as the central axis. The inner peripheral surface 55 partitions a through hole 54.

In FIG. 2, the rotor 31 has eight magnets 40. The magnets 40 are permanent magnets and have substantially the same shape. The eight magnets 40 are arranged in the rotor core 49 at equal angular intervals in the circumferential direction 105 in plan view from the axial direction 102. On the outer peripheral surface 53, N poles and S poles alternately appear in the circumferential direction 105 due to the eight magnets 40. Further, each magnetic pole is exposed from the outer peripheral surface 53. In other words, the rotor 31 is of a surface permanent magnet type (also referred to as an SPM type).

[Shaft 32]

In FIGS. 1 and 2, the shaft 32 is inserted through the through hole 54 and fixed to the inner peripheral surface 55 of the rotor core 49. In FIG. 1, both ends of the shaft 32 project in the axial direction 102 from the through hole 54 and are supported by the housing 36 via bearings 52. The shaft 32 is rotatable with respect to the housing 36 in the circumferential direction 105 together with the rotor 31. One end of the shaft 32 projects in the axial direction 102 from the inside to the outside of the housing 36 and serves as an output shaft of the motor 30.

Hereinafter, in the axial direction 102, the direction in which one end of the shaft 32 projects in the axial direction 102 from the inside to the outside of the housing 36 is also referred to as a first direction A11. The direction opposite to the first direction A11 is also referred to as a second direction A12.

[Schematic Configuration of Stator 33]

In FIG. 2, the stator 33 has twelve split cores 34 having substantially the same shape.

In FIG. 1, each split core 34 is a laminated body in which a plurality of electromagnetic steel sheets 42 is laminated in the axial direction 102. Hereinafter, two electromagnetic steel sheets 42 adjacent to each other in the axial direction 102 are also referred to as adjacent steel sheets 42. FIG. 1 illustrates a cross section of two split cores 34, in which a reference numeral 42 is attached to only one electromagnetic steel sheet per one split core 34. The thickness in the axial direction 102 of each electromagnetic steel sheet 42 is not particularly limited. The adjacent steel sheets 42 are welded by laser or the like at a position which is to be an outer peripheral surface 61 of a yoke 60 (see FIG. 2) of the stator 33. However, the adjacent steel sheets 42 may be joined by an adhesive or so-called dowel caulking, without being limited to the welding. Further, some of the adjacent steel sheets 42 maybe laser welded, and the remaining adjacent steel sheets 42 may be joined by the adhesive or the dowel caulking.

In FIGS. 2, 3A, 3B, and 3C, each split core 34 has a substantially T-shape in plan view from the axial direction 102, and has a core back 43 and a tooth 44.

In FIG. 2, each core back 43 is located away from the rotor 31 in a radial direction 103 of the axis 104. Although the radial direction 103 is a direction orthogonal to the axis 104, each figure illustrates only one example of the radial direction 103. Hereinafter, in the radial direction 103, the direction away from the rotor 31 is also referred to as a separation direction A21, and the direction opposite to the separation direction A21 is also referred to as an approach direction A22.

Figure 3A:
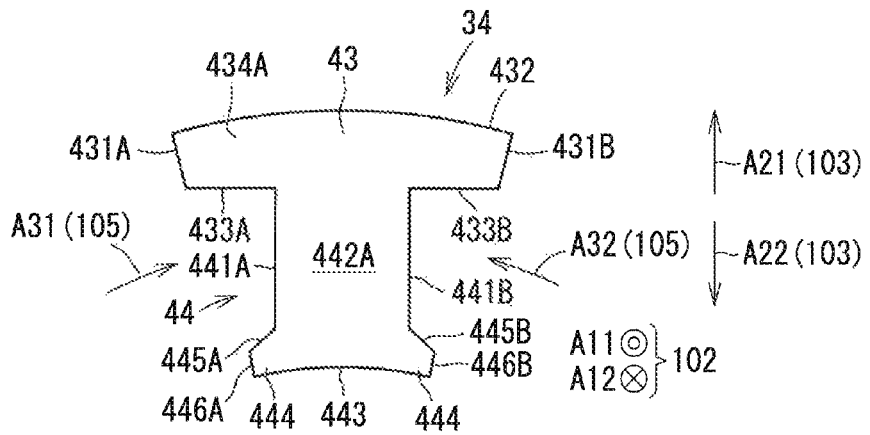
FIGS. 3A-3C are trihedral figures of a split core 34. In particular.
Figure 3B:
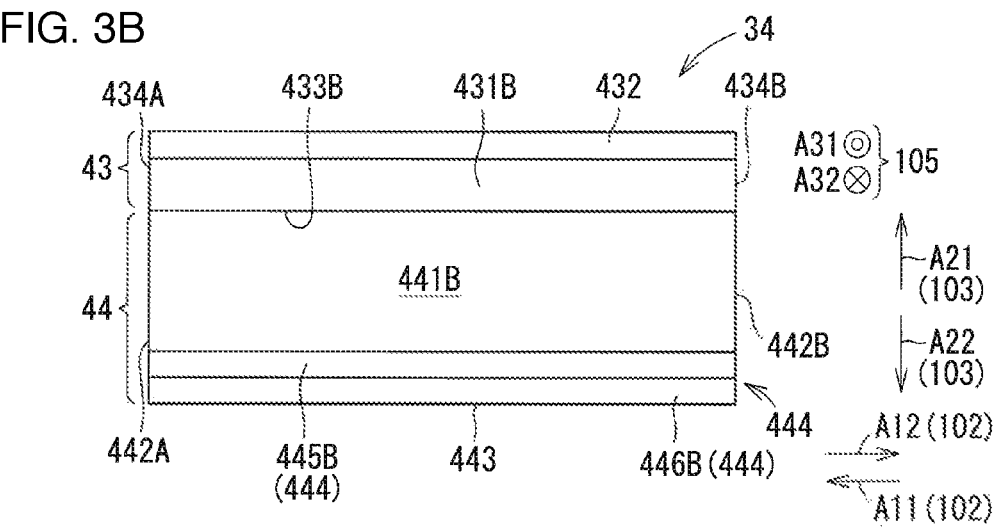
Figure 3C:
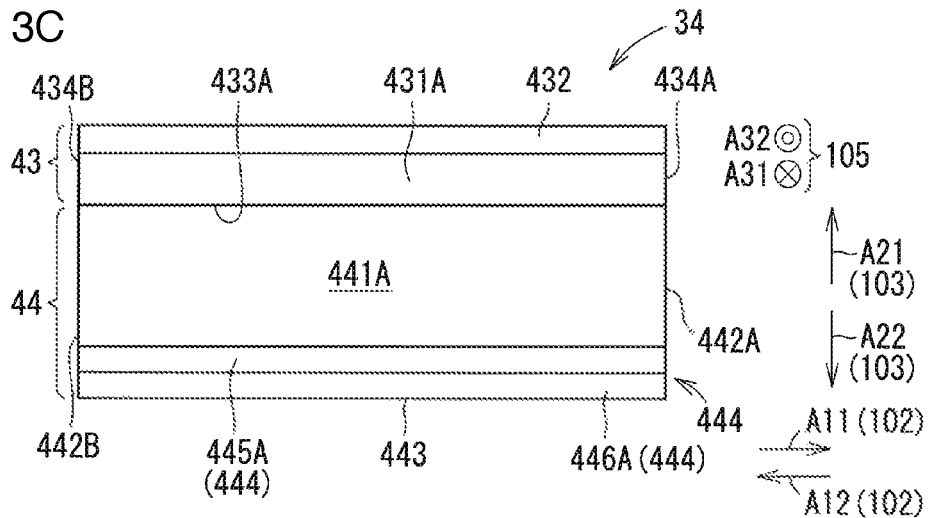

In FIGS. 3A, 3B, and 3C, each core back 43 has two side surfaces 431A and 431B, an outward-directed surface 432, two inward-directed surfaces 433A and 433B, and two end surfaces 434A and 434B.

In FIG. 3A, each of the side surfaces 431A and 431B is an end surface in the circumferential direction 105 of the core back 43. In FIGS. 3A and 3C, the side surface 431A crosses the circumferential direction 105, and the outer shape of the side surface 431A is a substantially rectangular shape elongated in the axial direction 102. In FIGS. 3A and 3B, the outer shape of the side surface 431B is symmetrical to the outer shape of the side surface 431A in the circumferential direction 105. Since the number of the split cores 34 is twelve, the side surfaces 431A and 431B are separated from each other with an angular interval of substantially 30° in the circumferential direction 105. The side surfaces 431A and 431B are respectively provided with a recessed portion 435A and a projection portion 435B (see FIGS. 4A and 4B) which are fitted to each other, for joining the core backs 43 to each other.

In FIGS. 2, 3A, 3B, and 3C, the outward-directed surface 432 is the end surface in the separation direction A21 of the core back 43. The outward-directed surface 432 has a substantially arc shape in plan view from the axial direction 102.

In FIGS. 3A, 3B, and 3C, each of the inward-directed surfaces 433A and 433B is a tip surface in the approach direction A22 of the core back 43. The outer shape of the inward-directed surface 433A is a substantially rectangular shape elongated in the axial direction 102. In FIG. 3A, the inward-directed surface 433A extends from the side on the tip end in the approach direction A22 of the side surface 431A toward a side surface 441A of the tooth 44 along a direction orthogonal to the approach direction A22. In FIG.

3A, the inward-directed surface 433B has an outer shape symmetrical to that of the inward-directed surface 433A in the circumferential direction 105 with the tooth 44 interposed therebetween.

In FIGS. 3A, 3B, and 3C, the end surfaces 434A and 434B are located at both ends in the axial direction 102 of the core back 43.

In FIG. 3A, each tooth 44 extends in the approach direction A22 from between the inward-directed surfaces 433A and 433B. As illustrated in FIG. 2, the extension end of each tooth 44 is separated in the separation direction A21 from the outer peripheral surface 53 of the rotor core 49. In other words, each tooth 44 and the outer peripheral surface 53 face each other via a gap (space). As illustrated in FIGS. 3A, 3B, and 3C, each tooth 44 has two side surfaces 441A and 441B, two end surfaces 442A and 442B, and a tooth tip surface 443.

As illustrated in FIG. 3A, the side surface 441A extends in the approach direction A22 from the end in the third direction A31 of the inward-directed surface 433A. Herein, the third direction A31 is one direction in the circumferential direction 105, and is the clockwise direction in FIGS. FIGS. 2, 3A, 3B, and 3C, The fourth direction A32 is the other direction in the circumferential direction 105, and the direction opposite to the third direction A31. As illustrated in FIGS. 3A and 3C, the side surface 441A is a part of the end surface in the fourth direction A32 of the tooth 44, and is a flat surface having a substantially rectangular shape elongated in the axial direction 102.

As illustrated in FIGS. 3A and 3B, the side surface 441B extends in parallel to the side surface 441A from the end in the fourth direction A32 of the inward-directed surface 433B. The side surface 441B has a shape symmetrical to that of the side surface 441A in the circumferential direction 105.

In FIGS. 3A, 3B, and 3C, the end surface 442A is located at the end in the first direction A11 of the tooth 44 and is directed in the first direction A11. In FIGS. 3B and 3C, the end surface 442B is located at the end in the second direction A12 of the tooth 44 and is directed in the second direction A12. The end surfaces 442A and 442B are flush with the end surfaces 434A and 434B, respectively. The "flush" means that the surfaces are parallel to each other without a level difference.

In FIGS. 2 and 3A, the tooth tip surface 443 is the tip surface (i.e., the extension end surface) in the approach direction A22 of the tooth 44, and has a substantially arc shape in plan view from the axial direction 102. The distance between both ends in the circumferential direction 105 of the tooth tip surface 443 is longer than the interval between the side surfaces 441A and 441B. In FIG. 2, a reference numeral 443 is attached to only one tooth tip surface.

As illustrated in FIGS. 3A, 3B, and 3C, the tooth 44 has a tooth tip 444 including the tooth tip surface 443, near the extension end. The tooth tip 444 projects in both the third direction A31 and the fourth direction A32 from the vicinities of the ends in the approach direction A22 of the side surfaces 441A and 441B. The tooth tip 444 has two inclined surfaces 445A and 445B and two side surfaces 446A and 446B in addition to the tooth tip surface 443.

The inclined surfaces 445A and 445B each have an outer shape of a substantially rectangular shape elongated in the axial direction 102. The outer shapes of the inclined surfaces 445A and 445B are symmetrical to each other in the circumferential direction 105 with the tooth 44 interposed therebetween. The inclined surface 445A extends from the end in the approach direction A22 of the side surface 441A and is inclined with respect to the side surface 441A. Specifically, the inclined surface 445A and the side surface 441A cross at an angle larger than 90°. The crossing angle may be 90°.

As illustrated in FIG. 2, the twelve split cores 34 are joined to each other such that the projection portion 435B (see FIG. 4B) of each split core 34 is fitted into the recessed portion 435A (see FIG. 4A) of another split core 34 and the outward-directed surface 432 of each core back 43 forms a cylindrical surface. Thus, the yoke 60 of the stator 33 is formed, and the stator 33 is arranged to surround the outer peripheral surface 53 of the rotor 31. The twelve teeth 44 are arranged between the yoke 60 and the rotor 31 at an angular interval of substantially 30° in the circumferential direction 105.

Figure 5A:
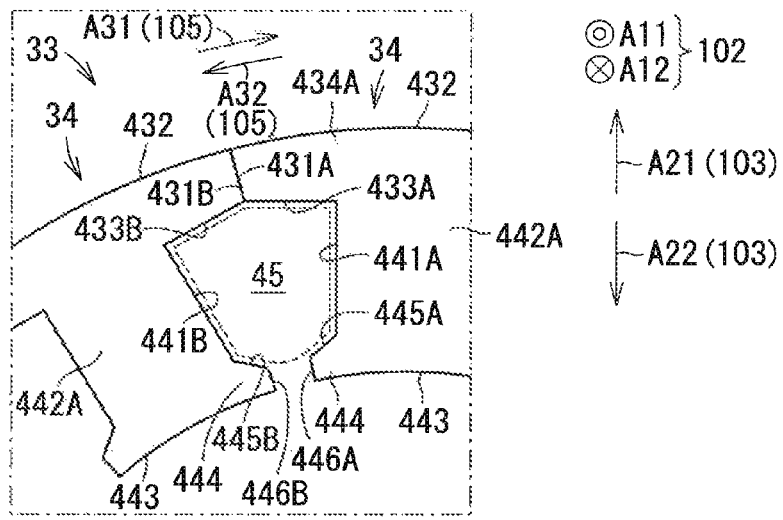
FIG. 5A is a schematic diagram illustrating a slot 45.

As illustrated in FIG. 5A, in the stator 33, a slot 45, which is a space for winding coils 39 described later around the teeth 44, is formed between the two split cores 34 adjacent to each other in the circumferential direction 105. More specifically, each slot 45 is a space partitioned by the inward-directed surface 433B, the side surface 441B, and the inclined surface 445B of one of the two split cores 34 and the inward-directed surface 433A, the side surface 441A, and the inclined surface 445A of the other split core 34. FIG. 5A, does not illustrate the coil 39 and insulating sheets 47A and 47B.

[Electrical Insulators 46A and 46B]

Figure 4A:
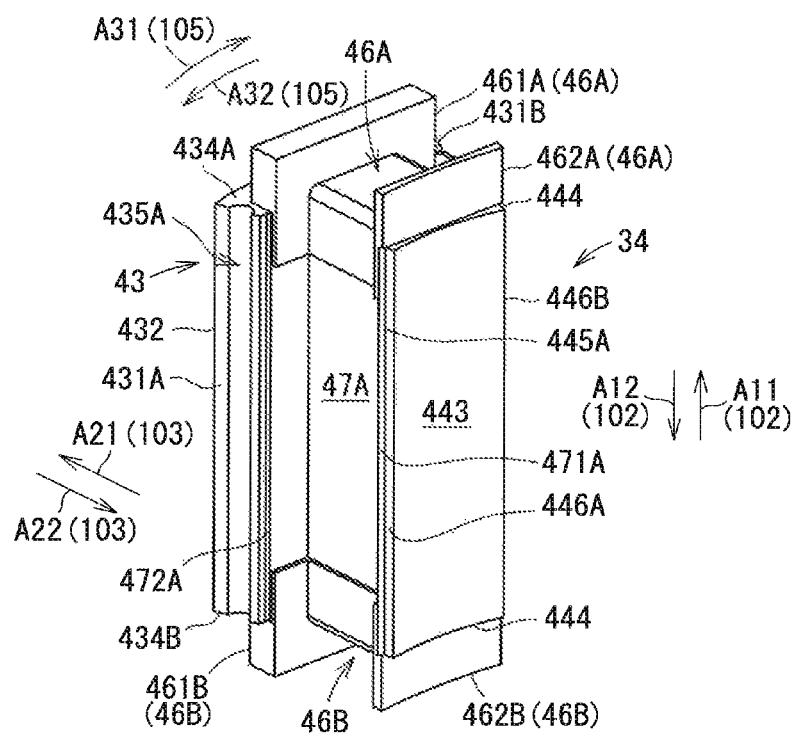
FIG. 4A is a perspective view when electrical insulators 46A and 46B and insulating sheets 47A and 47B attached to a tooth 44 are viewed from the third direction A31 side.
Figure 4B:
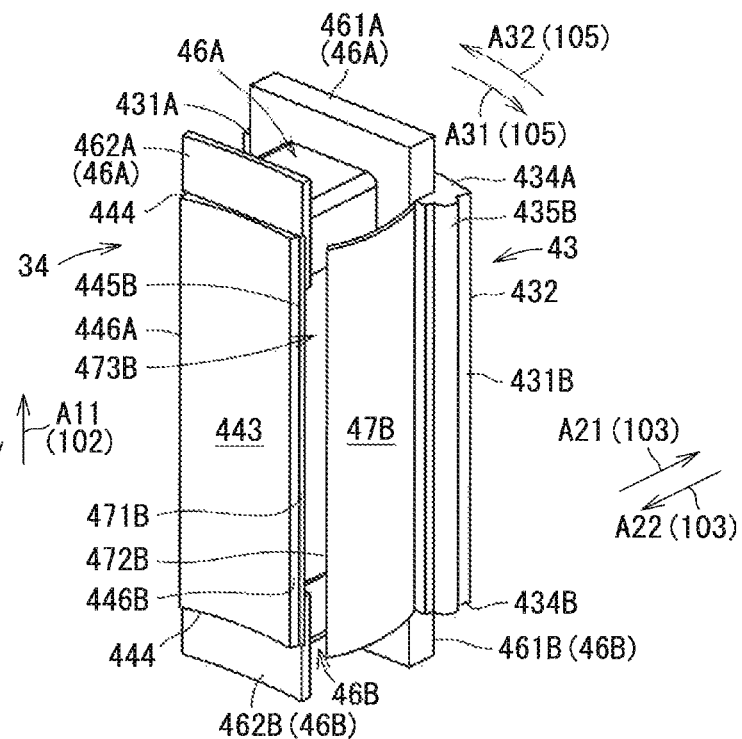
FIG. 4B is a perspective view when these components are viewed from the fourth direction A32 side.

In FIGS. 4A and 4B, the stator 33 has electrical insulators 46A and 46B per one split core 34. The electrical insulators 46A and 46B each have the same shape and are integrally molded products formed of a resin having electrical insulation properties.

Figure 5B:
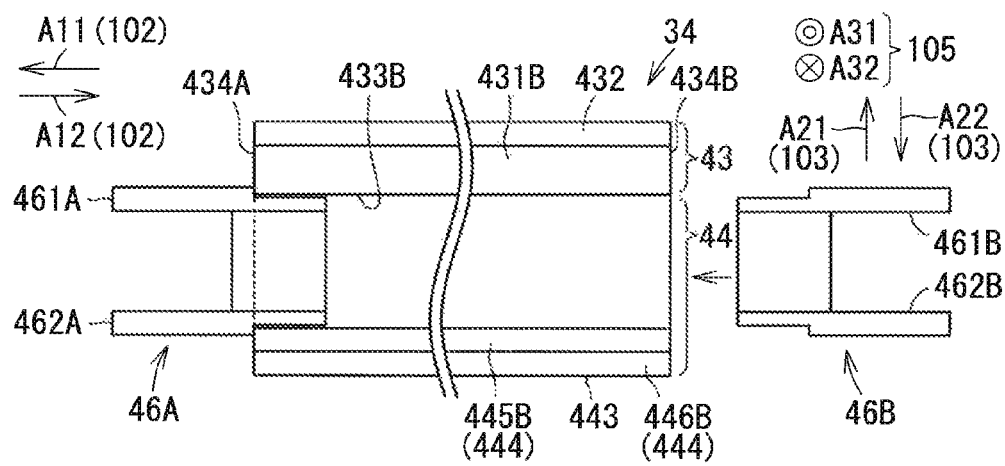
FIG. 5B is a schematic diagram illustrating the electrical insulators 46A and 46B attached to the split core 34.

As illustrated in FIG. 5B, the electrical insulator 46A is attached to the end in the first direction A11 of the split core 34 and covers substantially the entire region of the end surface 442A. The electrical insulator 46A further covers a part of the end surface 434A and the vicinities of the ends in the first direction A11 of each of the side surface 441A (see FIG. 3C), the side surface 441B, the inward-directed surface 433A (see FIG. 3C), and the inward-directed surface 433B. In FIG. 5B, the side surface 441A and the inward-directed surface 433A are hidden, and the insulating sheets 47A and 47B are not illustrated for convenience of description.

The electrical insulator 46A does not cover the outward-directed surface 432 of the core back 43 and the tooth tip surface 443 of the tooth 44.

In FIGS. 4 and 5B, the electrical insulator 46A has two flange portions 461A and 462A separated from each other in the radial direction 103. Each of the flange portions 461A and 462A has a thin plate shape in the radial direction 103. The flange portion 461A projects in the first direction A11 from the end in the separation direction A21 of the electrical insulator 46A. The flange portion 462A projects in the first direction A11 from the end in the approach direction A22 of the electrical insulator 46A. In a state where the electrical insulator 46A is attached to the split core 34, the flange portions 461A and 462A respectively project from the end surfaces 434A and 442A of the split core 34.

The electrical insulator 46B has two flange portions 461B and 462B, is attached to the end in the second direction A12 of the split core 34, and has a shape in which the electrical insulator 46A is inverted in the axial direction 102. Therefore, detailed descriptions of the flange portions 461B and 462B are omitted. In FIG. 5B, the electrical insulator 46B is illustrated in a state of being removed from the split core 34.

[Insulating Sheets 47A and 47B]

Figure 5C:
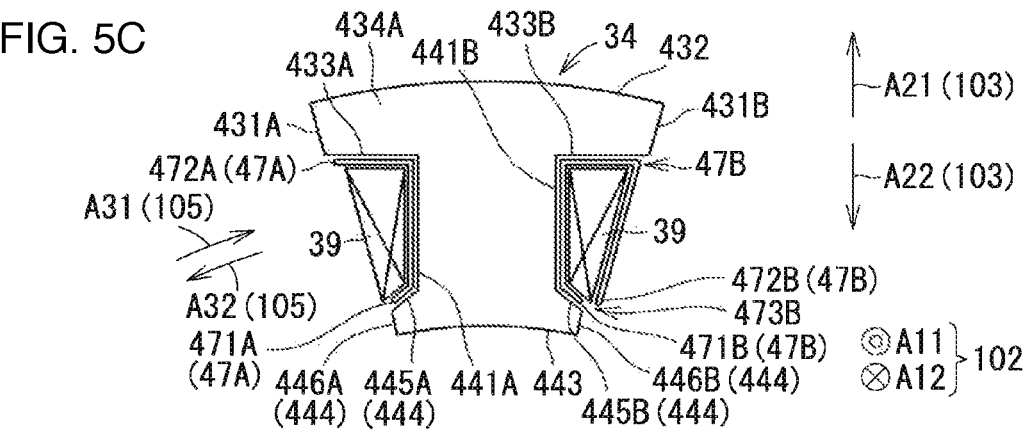
FIG. 5C is a schematic diagram illustrating detailed shapes of the insulating sheets 47A and 47B.

In FIGS. 4A, 4B, and 5C, the stator 33 has the two insulating sheets 47A and 47B per one split core 34. The insulating sheets 47A and 47B are formed, for example, by cutting a sheet having electrical insulation properties, such as a polyimide film, into a rectangular shape.

In FIG. 5C, the insulating sheet 47A is arranged along the inclined surface 445A, the side surface 441A, and the inward-directed surface 433A forming a part of the slot 45 to cover each of the inclined surface 445A, the side surface 441A, and the inward-directed surface 433A, and wraps a portion of a conductor bundle extending along the side surface 441A in the coil 39 wound around the tooth 44.

As illustrated in FIG. 4A, both end portions in the axial direction 102 of the insulating sheet 47A are sandwiched between the inclined surface 445A, the side surface 441A, and the inward-directed surface 433A, and the electrical insulators 46A and 46B, and are supported by these components. At this time, in the insulating sheet 47A, a side 471A (see FIGS. 4A and 5C) located on the approach direction A22 side of two sides substantially parallel to the axial direction 102 does not protrude outside the inclined surface 445A. Further, in the insulating sheet 47A, the other side 472A (see FIGS. 4A and 5B, located on the separation direction A21 side of the two sides substantially parallel to the axial direction 102 does not protrude outside the inward-directed surface 433A.

In FIG. 5C, the insulating sheet 47B is arranged along the inclined surface 445B, the side surface 441B, and the inward-directed surface 433B forming the remaining part of the slot 45 to cover the inclined surface 445B, the side surface 441B, and the inward-directed surface 433B. Both end portions in the axial direction 102 of the insulating sheet 47B are sandwiched between the inclined surface 445B, the side surface 441B, and the inward-directed surface 433B, and the electrical insulators 46A and 46B, and are supported by these components. The insulating sheet 47B wraps a portion of a conductor bundle extending along the side surface 441B in the coil 39 wound around the tooth 44. The insulating sheet 47B is attached such that the side 471B (see FIGS. 4B and 5C) substantially parallel to the axial direction 102 and located on the approach direction A22 side does not protrude outside the inclined surface 445B. The insulating sheet 47B is bent in the approach direction A22 near the end in the third direction A31 in the inward-directed surface 433B. The insulating sheet 47B extends toward the tooth tip 444 along the end in the third direction A31 of the coil 39 wound around the tooth 44. Aside 472B, which is an extension end of the insulating sheet 47B, reaches a position where the side 472B does not reach and does not contact the side 471B on the inclined surface 445B. Therefore, as illustrated in FIG. 5C, an opening 473B is formed between the sides 471B and 472B in the insulating sheet 47B. Further, the side 472B does not contact and does not overlap with the side 471B in the insulating sheet 47B. In other words, the insulating sheet 47B is not laminated around the coil 39 and wraps, in a single layer, substantially the entire circumference of a coil conductor bundle extending along the side surface 441B in a substantially parallel manner.

[Coil 39]

Each coil 39 is wound around each tooth 44, with the electrical insulators 46A and 46B and the insulating sheets 47A and 47B interposed between each coil 39 and each tooth 44. More specifically, each coil 39 is wound around the tooth 44 while passing through between the inclined surface 445A and the inward-directed surface 433A, between the inclined surface 445B and the inward-directed surface 433B, between the flange portions 461A and 462A, and between the flange portions 461B and 462B. The number of windings and the arrangement of each coil 39 are determined such that each coil 39 does not extend in the third direction A31 beyond the ends in the third direction A31 in the inward-directed surface 433B and the inclined surface 445B and does not extend in the fourth direction A32 beyond the ends in the fourth direction A32 in the inward-directed surface 433A and the inclined surface 445A.

After the coil 39 is wound, the coil 39 may be filled and impregnated with an adhesive or varnish. The hardening of the adhesive or the varnish suppresses the loosening of the wound coil 39. Further, the insulating sheet 47B may also be bonded to the coil 39 with the adhesive or the varnish.

In actual use of the rotary electric machine 10, each coil 39 is supplied with U-phase, V-phase, and W-phase AC voltages via the harness 38 (see FIG. 1) under the control of the controller 37, and thus a rotating magnetic field is formed in the stator 33, resulting in the rotation of the rotor 31.

[Operational Effects of Stator 33 and Rotary Electric Machine 10]

In the stator 33 and the rotary electric machine 10, as is understood from FIG. 5C, the insulating sheet 47B spreads between the two coils 39 adjacent to each other in the circumferential direction 105 in each slot 45. The insulating sheet 47B covers the end in the third direction A31 of the coil 39 wound around the tooth 44 to which the insulating sheet 47B is attached, between the end surfaces 442A and 442B in the axial direction 102 and between the inward-directed surface 433B and the inclined surface 445B in the radial direction 103 (see FIG. 4B). Thus, the insulating sheet 47B can secure the electrical insulation properties between the coil 39 wrapped by the insulating sheet 47B and the coil 39 adjacent to the coil 39 wrapped by the insulating sheet 47B in the slot 45. In the slot 45, the insulating sheet 47A wrapping the adjacent coil 39 is present, but the insulating sheet 47A does not cover the end in the fourth direction A32 of the coil 39 wound around the tooth 44 to which the insulating sheet 47A is attached. Further, as described above, the insulating sheet 47B itself wraps, in a single layer, substantially the entire circumference of the conductor bundle of the coil 39 extending along the side surface 441B in a substantially parallel manner in the coil 39. In other words, only the insulating sheet 47B in a single layer is interposed between the two coils 39 adjacent to each other in the slot 45. Therefore, according to the embodiment, the space factor is not reduced, and the size of the rotary electric machine 10 can be reduced.

The insulating sheet 47B spreads between the two coils 39 adjacent to each other in the circumferential direction 105 in each slot 45. Therefore, even when at least one of the coils 39 is loosened at a winding end portion or the alignment of the conductors of the coils 39 is disordered in the slot 45, the contact with the other coil 39 is prevented.

Each of the insulating sheets 47A and 47B wraps the corresponding coil 39 in a single layer. This also does not cause a reduction in the space factor.

The number of windings of the coil 39 is smaller on the tooth tip 444 side than on the core back 43 side. In other words, in the two coils 39 adjacent to each other in the slot 45, the interval in the circumferential direction 105 on the tooth tip 444 side is wider than the interval in the circumferential direction 105 on the core back 43 side. Thus, even when the insulating sheet 47B forms the opening 473B at a position closer to the tooth tip 444 than the core back 43, the coils 39 are difficult to come into contact with each other, and the electrical insulation properties can be secured.

The stator 33 includes the insulating sheet 47A on the fourth direction A32 side with the tooth 44 as a reference and includes the insulating sheet 47B on the third direction A31 side with the tooth 44 as a reference. Thus, all the split cores 34 can be produced in the same process. In other words, there is no necessity of producing two types of split cores 34 as in a modification example in a later paragraph.

Each of the insulating sheets 47A and 47B is supported by being sandwiched between the electrical insulators 46A and 46B and the split core 34. In this manner, in the embodiment, the electrical insulation properties between the coil 39 and the split core 34 are secured not only by the insulating sheets 47A and 47B but also by the electrical insulators 46A and 46B. Further, since the insulating sheets 47A and 47B are less likely to be displaced from the split core 34, the coil 39 is easily wound around the tooth 44.

[Modification Example]

Figure 6:
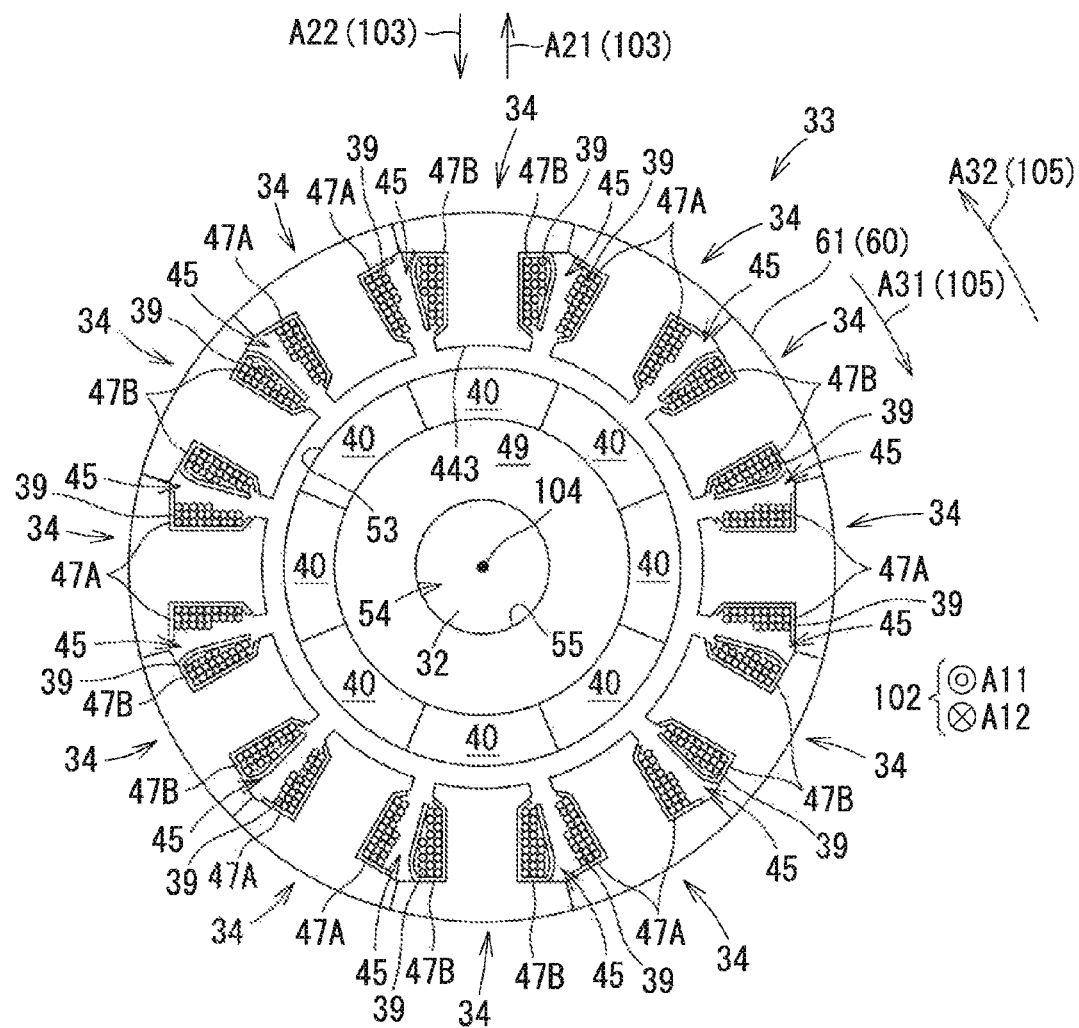
FIG. 6 is a schematic diagram illustrating a modification example of the rotary electric machine 10.
Figure 7:
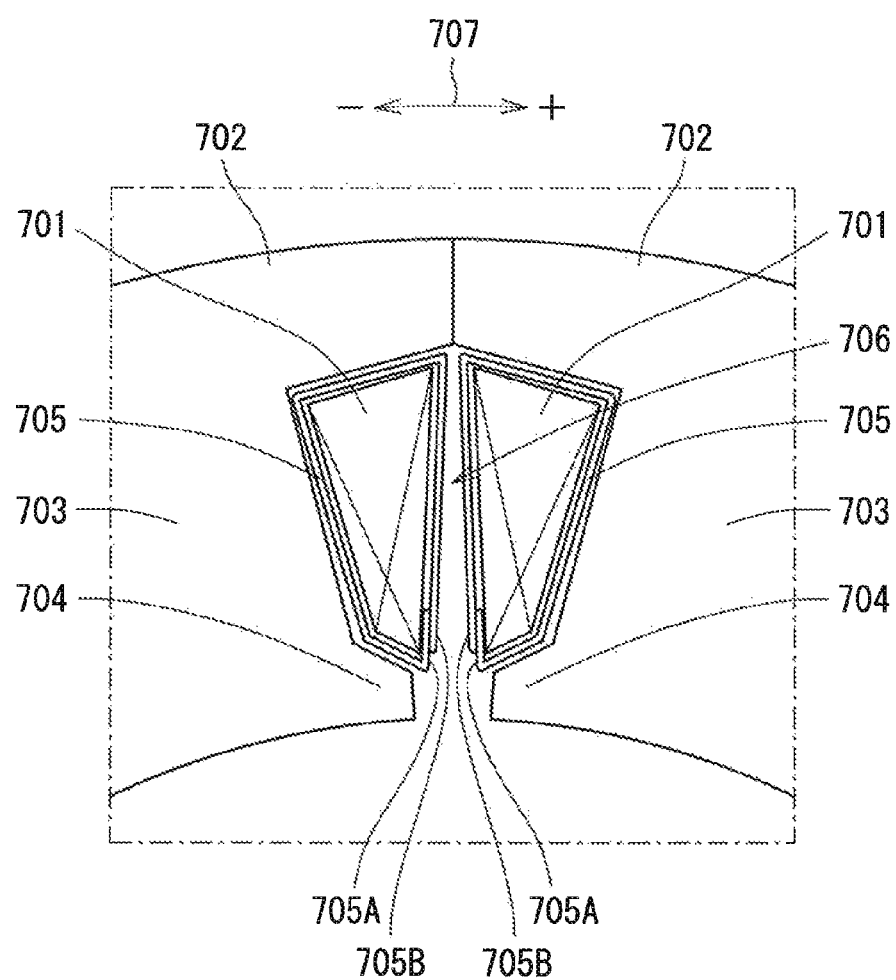
FIG. 7 is a schematic diagram illustrating an overlap of insulating sheets 705 according to a background art.

In the embodiment, the stator 33 includes the insulating sheets 47A and 47B on both sides in the circumferential direction 105 of the tooth 44. However, the present invention is not limited thereto, and as illustrated in FIG. 6, in the stator 33, the two insulating sheets 47A may be arranged on both sides in the circumferential direction 105 every other tooth 44 in the circumferential direction 105 to be symmetrical with respect to the circumferential direction 105 with the tooth 44 interposed therebetween. In this case, the two insulating sheets 47B are arranged on both sides in the circumferential direction 105 of the interposing tooth 44, to be symmetrical with respect to the circumferential direction 105 with the tooth 44 interposed therebetween. Such an arrangement of the insulating sheets 47A and 47B is applied to all the teeth 44 arranged in the circumferential direction 105.

[Other Modification Examples]

In the embodiment, the insulating sheet 47B forms the opening 473B at a position close to the tooth tip 444. However, the present invention is not limited thereto, and the insulating sheet 47B may form the opening 473B at a position closer to the tooth tip 444 than the core back 43 or may form the opening 473B at a position closer to the core back 43 than the tooth tip 444.

Further, the electrical insulators 46A and 46B may not be necessarily provided, and the tooth 44 and the coil 39 may be insulated by the insulating sheets 47A and 47B and other members.

The rotary electric machine 10 is the electric machine in the embodiment, but may be an electric generator.

In the embodiment, the outer peripheral surface 53 of the rotor core 49 has the substantially cylindrical shape. The present invention is not limited thereto, and the outer peripheral surface 53 may have a regular polygonal columnar shape.

In the embodiment, the stator 33 has the twelve slots and the rotor core 49 has the eight poles, but the number of the slots and the number of the magnetic poles are not limited thereto.

In the embodiment, the rotor 31 is of a surface permanent magnet type (SPM type). However, the present invention is not limited thereto, and the rotor 31 may be of an interior permanent magnet type (IPM type).

In the embodiment, the number of the teeth 44 is twelve. However, the present invention is not limited thereto, and the number of the teeth 44 may be three or more. In other words, the number of the split cores 34 may be three or more. Further, one split core 34 may have a plurality of teeth 44.

The present invention is also directed to a stator including a plurality of split cores each having a yoke and a tooth, the plurality of split cores being connected such that a plurality of yokes form an annular shape in a state where each side surface of a plurality of teeth is covered with an insulating sheet and a coil is wound around to each of the teeth, wherein the insulating sheet is one of a first insulating sheet and a second insulating sheet, the first insulating sheet and the second insulating sheet are respectively located in each slot partitioned by the two teeth adjacent to each other, the first insulating sheet is located between the side surface of one of the two adjacent teeth and the coil wound around the tooth, and is located between the coils respectively wound around the two adjacent teeth in each slot, and the second insulating sheet is located between the side surface of another one of the two adjacent teeth and the coil wound around the tooth, and is not located between the coils respectively wound around the two adjacent teeth in each slot.

In the stator, a single layer of the first insulating sheet is located between the coils respectively wound around the two adjacent teeth in each slot. Further, the first insulator covers a part of both of the side surfaces of the tooth, the second insulator covers a part of both of the side surfaces of the tooth, in the insulating sheet covering one side surface of the tooth, both of end portions in the axial direction are located between the first insulator and the second insulator, and the side surface of the tooth, and in the insulating sheet covering another side surface of the tooth, both of the end portions in the axial direction are located between the first insulator and the second insulator, and the side surface of the tooth.

DESCRIPTION OF REFERENCE NUMERALS 10 rotary electric machine
30 brushless motor
31 rotor
40 magnet
33 stator
34 split core
43 core back
44 tooth
444 tooth tip
46A, 46B electrical insulator (insulator)
47A, 47B insulating sheet
39 coil

The invention claimed is:

1. A stator comprising:
a plurality of split cores each having a yoke and a tooth, the plurality of split cores being connected such that the yoke of each one split core together form an annular shape in a state where each side surface of each tooth is covered with an insulating sheet and a coil is wound around each tooth,
wherein the insulating sheet is one of a first insulating sheet and a second insulating sheet, the first insulating sheet and the second insulating sheet are respectively located in each slot partitioned by each two teeth adjacent to each other among the plurality of split cores,
the first insulating sheet is located between the side surface of one of the two adjacent teeth and the coil wound around the tooth, and is located between the coils respectively wound around the two adjacent teeth in each slot, and
the second insulating sheet is located between the side surface of another one of the two adjacent teeth and the coil wound around the tooth, and is not located between the coils respectively wound around the two adjacent teeth in each slot.

2. The stator according to claim 1, wherein a single layer of the first insulating sheet is located between the coils respectively wound around the two adjacent teeth in each slot.

3. The stator according to claim 2, wherein the first insulating sheet is opened on a tip side of the tooth.

4. The stator according to claim 1, wherein one of the first insulating sheet and the second insulating sheet is located on both side surfaces of the tooth.

5. The stator according to claim 1, wherein, on the tooth of one of the two adjacent teeth, one of the first insulating sheet and the second insulating sheet is located on one side surface, and another one of the first insulating sheet and the second insulating sheet is located on another side surface.

6. The stator according to claim 1, further comprising:
a first insulator covering a first end surface directed in an axial direction of the stator in the tooth; and
a second insulator covering a second end surface directed in the axial direction of the stator in the tooth, wherein
the coil is wound around the tooth via the first insulator and the second insulator.

7. The stator according to claim 6, wherein
the first insulator covers a part of both of the side surfaces of the tooth,
the second insulator covers a part of both of the side surfaces of the tooth,
as for the insulating sheet covering one side surface of the tooth, both end portions in the axial direction are located between the first insulator and the second insulator, and the side surface of the tooth, and
as for the insulating sheet covering another side surface of the tooth, both end portions in the axial direction are located between the first insulator and the second insulator, and the side surface of the tooth.

8. A rotary electric machine comprising:
the stator according to claim 1, and
a rotor inserted through the stator and having a magnet.

9. A stator comprising:
a plurality of split cores each having a yoke and a tooth, the split cores being connected such that the yokes form an annular shape; and
coils each wound around each tooth with two insulating sheets interposed between the coil and the tooth, wherein
the two insulating sheets include at least one of a first insulating sheet and a second insulating sheet,
the first insulating sheet is located between a side surface of the tooth and the coil wound around the tooth, and wraps the coil,
the second insulating sheet is located between another side surface of the tooth and the coil wound around the tooth, and does not cover a part of the coil, the part being on a side of an adjacent coil,
the first insulating sheet and the second insulating sheet are adjacently located in the coils adjacent to each other,
the stator further comprising:
a first insulator covering a first end surface directed in an axial direction of the stator in the tooth; and
a second insulator covering a second end surface directed in the axial direction of the stator in the tooth, wherein
the coil is wound around the tooth via the first insulator and the second insulator,
the first insulator covers a part of both of the side surfaces of the tooth,
the second insulator covers a part of both of the side surface of the tooth, for one of the two insulating sheets, both of end portions in the axial direction are located between the first insulator and the second insulator, and the side surface of the tooth, and
for another one of the two insulating sheets, both of the end portions in the axial direction are located between the first insluator and the second insulator, and the side surface of the tooth.

10. A stator comprising:
a plurality of split cores each having a yoke and a tooth, each one core of the plurality of split cores extending longitudinally along an axial direction, the plurality of split cores arranged circumferentially to be connected such that the yokes form an annular shape,
for each one core of the plurality of split cores, a coil is wound around the tooth;
for each one tooth of the plurality of split cores, the one tooth having a first axially extending sidewall and a second axially extending sidewall;
wherein for each one core among the plurality of split cores, a space occurs between the tooth of the one core and the tooth of an adjacent core; and
wherein in the space between the first axially extending sidewall of the tooth of the one core and the second axially extending sidewall of the tooth of the adjacent core are located in circumferential order: one of either a first portion of a first insulation sheet and a first portion of a second insulation sheet, windings of the one core, a second portion of the first insulation sheet, windings of the adjacent core, and another of either the first portion of the first insulation sheet and the first portion of the second insulation sheet, so that the windins of the one core and adjacent core are separated only by the second portion of the first insulation sheet and by an air gap, without any overlapping with the first insulation sheet.

11. The stator according to claim 10, further comprising, for each one tooth:
a first insulator covering a first end surface and a part of the first axially exending sidewall and a part of the second axially extending sidewall;
a second insulator covering a second end surface opposite the first end surface and a part of the first axially exending sidewall and a part of the second axially extending sidewall; and
wherein the coil is wound around the tooth via the first insulator and the second insulator;
for at least one sheet of the first insulation sheet and the second insulation sheet, both of end portions of the one sheet in the axial direction are located between the first insulator and the second insulator, and the first axially extending sidewall of the one tooth.

12. The stator according to claim 11, wherein for another sheet of the first insulation sheet and the second insulation sheet, both of the end portions of the another sheet in the axial direction are located between the first insulator and the second insulator, and the second axially extending sidewall of the one tooth.

13. The stator according to claim 10, wherein for each one core of the plurality of split cores, the first insulation sheet extends along the first axially extending sidewall and the second insulation sheet extends along the second axially extending sidewall.

14. The stator according to claim 10, wherein for a first subset of the plurality of split cores, one first insulation sheet extends along the first axially extending sidewall and another first insulation sheet extends along the second axially extending sidewall; and wherein for a second subset of the plurality of split cores, one second insulation sheet extends along the first axially extending sidewall and another second insulation sheet extends along the second axially extending sidewall.

15. The stator according to claim 1, wherein between said each two teeth adjacent to each other in a space between the coils of said two teeth, there is no overlap of any one sheet of the first insulating sheet and the second insulating sheet with said one sheet, and there is no overlap of said one sheet with another of the first insulating sheet and the second insulating sheet.

16. The stator according to claim 1, wherein the first insulation sheet and second insulation sheet are two separate sheets lacking contact with each other.

* * * * *